United States Patent Office 3,738,954
Patented June 12, 1973

3,738,954
VINYL ESTER/ISOBUTENE COPOLYMER
DISPERSION
Francis Paul Gintz, Sutton, England, assignor to BP
Chemicals (U.K.) Limited, London, England
No Drawing. Continuation of application Ser. No.
695,850, Jan. 5, 1968. This application Jan. 18,
1971, Ser. No. 107,452
Int. Cl. C08f 45/24
U.S. Cl. 260—29.6 R    6 Claims

ABSTRACT OF THE DISCLOSURE

A process for the production of film forming aqueous dispersions of copolymers of vinyl esters of organic acids and isobutene having low residual monomer content, the process comprising copolymerising a vinyl ester of an organic acid (e.g. vinyl acetate) and isobutene in aqueous dispersion until 65 to 95 percent by weight of the total monomer charge is converted to polymer and then removing unpolymerised isobutene and continuing polymerisation of residual vinyl ester.

---

This application is a continuation of Ser. No. 695,850 filed Jan. 5, 1968, now abandoned.

The present invention is concerned with improvements in and relating to processes for the production of film forming aqueous dispersions of copolymers of vinyl esters of organic acids and isobutene, the dispersions so formed and films formed from the dispersions.

An object of the present invention is to provide a process for the production of aqueous dispersions of copolymers of vinyl esters of organic acids and isobutene having low residual monomer content wherein good conversion of the total monomer charge to polymer can be obtained in commercially acceptable reaction times.

The process for the production of an aqueous dispersion of a copolymer of a vinyl ester of an organic acid and isobutene according to the present invention comprises copolymerizing a vinyl ester of a saturated monocarboxylic acid and isobutene in an aqueous dispersion in the presence of a free radical catalyst and a surface active agent and/or a protective colloid until an amount of monomer in the range 65 to 95 percent by weight of the total monomer charge is converted to polymer and then removing unpolymerized isobutene from the dispersion and continuing the polymerisation of residual vinyl ester.

Additional catalyst is preferably added after removing unpolymerised isobutene from the system.

Most suitably the acid component of the vinyl ester of the saturated monocarboxylic acid contains 1 to 12 carbon atoms. This component can be derived from an aliphatic or aromatic acid. Some examples of these esters are vinyl acetate, vinyl propionate, vinyl butyrate, vinyl esters of tertiary aliphatic carboxylic acids, such as Shell Chemical Company's "Veova 911" and vinyl benzoate. The invention is particularly concerned with the vinyl esters of acetic acid or substituted acetic acid e.g. vinyl esters of trimethyl acetic acid. Mixtures of vinyl esters of saturated monocarboxylic acid are also suitable as are mixtures of the vinyl esters with other copolymerisable unsaturated monomers, for example acrylic, methacrylic, fumaric or itaconic acid, or esters of these acids or vinyl halides. These other monomers contain polymerisable unsaturated carbon-carbon bonds such as ethylenic unsaturation. They can be present in the polymerisation in quantities which give copolymers having up to 50% by weight of the monomer residues. Minor amounts of monomers containing more than one polymerisable unsaturated carbon-carbon bond, such as ethylene glycol diacrylate, butylene glycol dimethacrylate, vinyl acrylate, triallyl cyanurate or divinyl adipate may be present. Most suitably the polymer produced should not contain more than 45 percent by weight of residues of copolymerisable monomers other than the vinyl ester and the isobutene and the relative quantities of monomers present in the polymerisation should be adjusted accordingly.

Free radical catalysts are well known and any such catalyst can be used in the present process. The catalyst can consist of a single compound or can comprise a plurality of compounds which act in combination as a system and can be water or oil soluble. Some examples are the organic and inorganic peroxides, persulphates and peroxy carbonates such as ammonium persulphate and the dialkyl percarbonates, e.g. di-isopropyl peroxy dicarbonate; azo compounds such as azo-bis-iso-butyronitrile, and redox systems.

Typical activators in redox systems are alkali metal sulphites, dithionates, thiosulphates and aldehyde sulphoxylates, secondary and tertiary amines, or transition metal salts in their lower valency form. Some examples of redox systems are potassium persulphate/sodium metabisulphite, cumene hydroperoxide/complexed ferrous iron, ammonium persulphate/sodium formaldehyde sulphoxylate, sodium chlorate/sodium sulphite.

The surface active agent can be selected from any of the known ionic or non-ionic surface active products which can be used either singly or as mixtures. Some examples of ionic surface active agents are the anionic agents, e.g. the alkali metal salts of alkaryl sulphonic acids, (e.g. sodium dodecyl diphenyl ether disulphonate) alkali metal salts of long chain fatty acid sulphates (e.g. sodium lauryl sulphate) and esters of sodium sulphosuccinic acid (e.g. sodium dioctyl sulphosuccinate), and non-ionic agents such as ethylene oxide/nonyl phenol condensates and long chain fatty acid monoesters of polyhydroxy alcohols (e.g. sorbitol mono-oleate). Mixtures of anionic and non-ionic surface active agents are particularly effective.

The use of protective colloids in aqueous free radical polymerisation systems is well known and any such colloid can be used here. Some examples are polyvinyl alcohols and water soluble cellulose derivatives (e.g. cellulose ethers such as methyl or hydroxyethyl cellulose).

The polymerisation can be carried out by dispersing the reactants in water to form an emulsion or suspension. The weight of water in relation to the total weight of monomer charge is most suitably in the range 10:1 to 1:2 and preferably about 1:1. The weight of vinyl ester in relation to the weight of isobutene charge is most suitably in the range 99:1 to 75:25, and preferably in the range 90:10 to 80:20. The free radical forming copolymerisation catalyst should be present in an effective amount to initiate polymerisation. Most suitably the weight of catalyst in relation to the weight of monomer charge is in the range 0.1 to 2.0 percent and preferably in the range 0.5 to 1.5 percent. The weight of dispersion stabilisers, that is surface active agent or agents, and colloid, if present, to weight of monomer is preferably in the range 0.5 to 6.0 percent.

The process can be batch, semi-continuous or continuous and in the case of semi-continuous processes either the vinyl ester or the isobutene or both can be proportionated. In the preferred form of the semi-continuous process all the isobutene is charged initially and the vinyl ester is proportionated. Catalyst may also be proportionated or added incrementally. For most commercial applications the proportion of monomer converted to polymer before the isobutene is removed is desirably in the range 75 to 90 percent by weight of the total weight of monomer charge.

The precise pressure at which the polymerisation is carried out is not critical, however it must be sufficient to maintain isobutene in the liquid phase at least until the isobutene is removed. This can be attained by preventing isobutene vapour escaping from the reactor. Pressures above atmospheric pressure, up to 200 p.s.i. are generally developed.

Most suitably unpolymerised isobutene can be removed by reducing the pressure on the dispersion to that at which the remaining isobutene can escape from the liquid phase e.g. by allowing the dispersion to vent freely to the atmosphere. At this point, the dispersion contains copolymer corresponding to 65 to 90% of the total monomer charge, together with unreacted vinyl ester and isobutene monomer.

Isobutene exerts a strong inhibitory influence on the polymerisation in emulsion polymerization systems and sufficient isobutene should be removed to minimise the effect and so permit the formation of copolymer dispersions having low free vinyl ester levels.

To minimise the loss of vinyl esters when venting isobutene from the system the latex temperature should be held below the atmospheric pressure boiling point of the vinyl ester. Alternatively vinyl ester can be condensed out of the vent gas. More polymerisation catalyst or activator may be added at this stage to complete the polymerisation of the vinyl ester. The reaction is preferably continued until the free monomer content is below about 0.5 percent by weight in relation to the weight of the latex.

The polymerisation temperature is not critical and any temperature which gives a sufficiently rapid reaction is suitable. It is most suitably in the range 40° C. to 100° C. The reaction time depends on such factors as the catalyst system used and the proportion of isobutene in the liquid phase.

The pH of the dispersion may be controlled, normally in the range 3.5 to 7.5, to minimise the hydrolysis of the vinyl ester. A suitable buffering agent such as potassium or sodium bicarbonate can be added for this purpose.

The polymerisation is most suitably carried out in the absence of oxygen.

Commercially acceptable film forming aqueous dispersions of copolymers of vinyl esters of organic acids and isobutene should not contain more than 2 percent, and preferably less than 1 percent by weight of free residual monomer. The present invention provides a process for preparing such dispersions in commercially acceptable reaction times, for example reaction times in the region of eight hours are often possible.

Stable aqueous dispersions of copolymers of the vinyl ester and isobutene having a solid content greater than 40 percent can be obtained by suitably adjusting the proportions of vinyl ester and isobutene to water present and the polymerisation conditions.

The following examples illustrate the process according to the present invention.

EXAMPLE 1

A 1 gallon stainless reactor was purged with nitrogen and an aqueous phase comprising

|   | Grams |
|---|---|
| Water | 700 |
| Potassium bicarbonate | 4.5 |
| Abex 18-S (a registered trademark for an anionic surfactant [30% solids]) | 60 |
| Empilan NP 30 (a registered trademark for a non-ionic surfactant) nonyl phenol ethoxylate | 27 | was charged. 238 mls. of vinyl acetate and 6 grams ammonium persulphate in 120 mls. of water were charged after further purging. The reactor was sealed and 128 grams of isobutene were blown in with nitrogen from a reservoir. The charge was stirred and heated up to 80° C., a pressure of 97 p.s.i. being developed. A further 593 mls. of vinyl acetate were then pumped to the reactor over a period of five hours during which time the pressure fell to 46 p.s.i. When pumping was completed the total solids content of the latex indicated a conversion of 82.6 percent. The charge was cooled to 50° C. and isobutene was vented off until the pressure in the reactor fell to atmospheric. The latex was then heated to 80° C. for two more hours. The solids content was 51.0 percent by weight and the vinyl acetate content 0.37 percent. The final conversion was 96.2 percent.

By way of comparison a duplicate polymerisation was carried out which differed from the foregoing only in that the cooling and venting steps were omitted. The solids content of the latex was 49.9 percent and the monomer content was 3.3 percent. The conversion was 94.2 percent.

EXAMPLE 2

A 1 gallon stainless steel reactor was purged with nitrogen and an aqueous phase comprising

| | | |
|---|---|---|
| Water | ml | 700 |
| Potassium bicarbonate | grams | 4.5 |
| Abex 18-S (A registered trademark) | do | 60 |
| Empilan NP 30 (A registered trademark) nonyl phenol ethoxylate | do | 27 | was charged. 166 mls. of vinyl acetate and 120 mls. of water containing 6.0 grams ammonium persulphate, 1.5 grams benzoyl peroxide and 1.5 grams sodium metabisulphite were charged after further purging. The reactor was sealed and 128 grams of isobutene were blown in with nitrogen from a reservoir. The charge was heated to 50° C. a pressure of 60 p.s.i. being developed. 664 ml. of viny lacetate were pumped to the reactor over a period of five hours. The charge temperature was maintained at 50° C. for the first 2.5 hours and then was raised to 80° C. for the remainder of polymerisation. When pumping was completed the total solids content indicated a conversion of 87.0 percent. The isobutene was vented off until the pressure in the reactor fell to atmospheric. The charge was then held for a further one hour at 80° C. The solids content was 50.5 percent by weight and the vinyl acetate monomer content was 0.5 percent. The conversion was 95.4 percent.

EXAMPLE 3

A 1 gallon reactor was purged with nitrogen and an aqueous phase comprising

|   | Grams |
|---|---|
| Water | 700 |
| Potassium bicarbonate | 4.5 |
| Abex 18-S (A registered trade mark) | 60 |
| Empilan NP 30 (A registered trademark) ronionic surfactant-nonyl phenol ethoxylate | 27 | was charged. 166 mls. of vinyl acetate, 2.7 grams butylene glycol dimethacrylate and 6.0 grams ammonium persulphate in 120 mls. of water were charged after further purging. The reactor was sealed and 128 grams of isobutene were blown in with nitrogen, from a reservoir. The charge was heated to 80° C. and a pressure of 110 p.s.i. developed. 664 mls. of vinyl acetate were then pumped to the reactor over a period of five hours during which time the pressure fell to 42 p.s.i. When pumping was completed the total solids content of the latex indicated a conversion of 79.4 percent. Heating was continued for a further hour, when the isobutene was vented off until the pressure in the reactor had fallen to atmospheric. 1.0 gram ammonium persulphate was charged and heating was continued for another one hour. The solids content was 50.0 percent and the free vinyl acetate monomer content was 0.67 percent. The conversion was 95.7 percent.

EXAMPLE 4

A 1 gallon stainless steel reactor was purged with nitrogen and an aqueous phase comprising:

| | Grams |
|---|---|
| Water | 750 |
| Abex 18-S (A registered trademark for an anionic surfactant [30% solids]) | 29 |
| Empilan NP 30 (A registered trademark for a nonionic surfactant) nonyl phenol ethoxylate | 22 |
| Gum Arabic AAA (A registered trademark for a grade of gum arabic) | 10 | was charged together with 323 grams of vinyl acetate in admixture with 17 grams of 2-ethyl hexyl acrylate. 3 grams of potassium persulphate dissolved in 75 grams of water containing 0.1 gram of Sequestrol 2Na (A registered trademark for an ethylene diamine tetracetic acid disodium salt) were charged and the reactor was sealed. 150 grams of isobutene were forced into the reactor from a warmed reservoir and the charge was stirred and heated to 80° C., a pressure of 85 p.s.i.g. being developed. The temperature of the charge was maintained at 80° C. for one hour after which time 484.5 grams of vinyl acetate in admixture with 25.5 grams of 2-ethyl-hexyl acrylate were pumped to the reactor over a period of 4 hours. During this period equal aliquots of a solution comprising 5.6 grams of potassium persulphate and 8 grams of sodium bicarbonate dissolved in 108 grams of water were added at 15 minute invervals. When pumping of these solutions was completed the charge was maintained at 80° C. for a further one hour. At the end of the period the pressure in the reactor fell to 64 p.s.i.g. The total solids content of the latex indicated a conversion of 83.7 percent. The charge was cooled to 60° C. and isobutene was vented off until the pressure in the reactor fell to atmospheric. A solution of 1.4 grams of potassium persulphate and 2 grams of sodium bicarbonate in 27 grams of water was pumped to the reatcor and the charge maintained at 80° C. for a further 2 hours. The final solids content of the latex was 48.1 percent and the free monomer content was vinyl acetate 0.59 percent and acrylate 0.14 percent. The final conversion was 92.1 percent.

By way of comparison a duplicate polymerisation was carried out which differed from the foregoing only in that the cooling and venting steps were omitted. The solids content of the latex was 47.8 percent and the monomer content was vinyl acetate 3.71 percent and acrylate 0.12 percent. The conversion was 91.5 percent.

EXAMPLE 5

A 1 gallon stainless steel reactor was purged with nitrogen and an aqueous phase comprising:

| | Grams |
|---|---|
| Water | 750 |
| Abex 18-S (A registered trademark for an anionic surfactant 30% solids content) | 29 |
| Empilan NP 30 (A registered trademark for a nonionic surfactant) nonyl phenol ethoxylate | 20 |
| Gelvatol 20/90 (A registered trademark for polyvinyl alcohol) | 10 | was charged together with 750 grams of vinyl acetate and a solution of 4.68 grams of ammonium persulphate and 3.34 grams of sodium bicarbonate dissolved in 155 grams of water, and the reactor was sealed. 100 grams of vinyl chloride were blown in with nitrogen from a reservoir together with 150 grams of isobutene from a warmed reservoir. The charge was stirred and heated to 80° C., a pressure of 97 p.s.i.g. being developed, and maintained at this temperature for 4 hours. After this period a solution comprising 1.51 grams of ammonium persulphate and 1.08 grams of sodium bicarbonate dissolved in 50 grams of water was pumped to the reactor over 15 minutes and the temperature of the charge was maintained at 80° C. for a further 2 hours. The pressure in the reactor fell to 85 p.s.i.g. and the solids content of the latex indicated a conversion of 85.1 percent.

The charge was cooled to 60° C. and isobutene and vinyl chloride vented off until the pressure in the reactor fell to atmospheric. A solution comprising 0.81 grams of ammonium persulphate and 0.58 grams of sodium bicarbonate dissolved in 16.5 grams of water was then pumped to the reactor and the charge heated to 80° C. for a further 2 hours. The final solids content of the latex was 49.2 percent and the free monomer content expressed as vinyl acetate was 0.62 percent. The final conversion was 95.3 percent.

By way of comparison a duplicate polymerisation was carried out which differed from the foregoing only in that the cooling and venting steps were omitted. The solids content of the latex was 47.4 percent and the monomer content expressed as vinyl acetate was 4.2 percent. The conversion was 91.6 percent.

EXAMPLE 6

A 1 gallon stainless steel reactor was purged with nitrogen and an aqueous phase comprising:

| | Grams |
|---|---|
| Water | 750 |
| Satinol (A registered trademark for an anionic surfactant) sodium lauryl sulfate | 5 |
| Renex 690 (A registered trademark for a nonionic surfactant) nonyl phenol (ethylene oxide)$_{10}$ ether reaction product | 15 |
| Natrosol 250L (A registered trademark for a hydroxy ethyl cellulose colloid) | 20 | was charged together with 260 grams of vinyl acetate in admixture with 80 grams of vinyl propionate. 3 grams of potassium persulphate dissolved in 75 grams of water containing 0.1 gram Sequestrol 2Na (a registered trademark for an ethylene diamine tetracetic acid disodium salt) were charged and the reactor was sealed. 200 grams of isobutene were forced into the reactor from a warmed reservoir and the charge was stirred and heated to 80° C., a pressure of 100 p.s.i.g. being developed. The temperature of the charge was maintained at 80° C. for one hour after which time 390 grams of vinyl acetate in admixture with 120 grams of vinyl propionate were pumped to the reactor over a period of 4 hours. During this period equal aliquots of a solution comprising 5.6 grams of potassium persulphate and 8 grams of anhydrous sodium carbonate dissolved in 108 grams of water were added at 15 minute intervals. When the pumping was completed, the charge was maintained at 80° C. for a further one hour. At the end of this period the pressure in the reactor fell to 80 p.s.i.g. and the solids content of the latex indicated a conversion of 68.1 percent. The charge was cooled to 55° C. and isobutene was vented off until the pressure in the reactor fell to atmospheric. A solution comprising 1.4 grams of potassium persulphate and 2 grams of anhydrous sodium carbonate dissolved in 27 grams of water was pumped to the reactor and the charge maintained at 80° C. for a further 2 hours. The final solids content of the latex was 49.2 percent and the free monomer content expressed as vinyl acetate was 1.75 percent. The final conversion was 91.4 percent.

By way of comparison a dupulicate polymerisation was carried out which differed from the foregoing only in that the cooling and venting steps were omitted. The solids content of the latex was 46.6 percent and the monomer content expressed as vinyl acetate was 5.9 percent. The conversion was 86.4 percent.

What is claimed is:

1. A process for the production of an aqueous dispersion of a film forming copolymer of (a) a vinyl ester monomer consisting of vinyl acetate or a mixture thereof with vinyl propionate and (b) isobutene monomer which comprises (1) copolymerizing the two monomers in an aqueous dispersion in the presence of a free radical catalyst and a surface active agent and/or a protective colloid until said dispersion contains solid copolymer in an amount of 65 to 95 percent by weight of the theoretical amount of copolymer based on total monomer charge, together with unpolymerized vinyl ester monomer and isobutene monomer, (2) removing said unpolymerized isobutene monomer and (3) continuing the polymerization of residual vinyl ester monomer until its level of residual monomer is below about 0.5% of the weight of copolymer.

2. A process as claimed in claim 1 wherein additional catalyst is added after removing unpolymerized isobutene from the system to drop reactor pressure to atmospheric pressure.

3. A process as claimed in claim 1 wherein all the isobutene is charged initially and the vinyl ester is added incrementally and continuously.

4. A process as claimed in claim 1 wherein the unpolymerized isobutene is removed by allowing the dispersion to vent freely to the atmosphere.

5. A process as claimed in claim 1 wherein the vinyl ester is vinyl acetate.

6. A process for the production of an aqueous dispersion of a copolymer of vinyl acetate and isobutene which comprises copolymerizing vinyl acetate and isobutene monomer of vinyl acetate monomer, isobutene monomer and up to 50% by weight of a copolymerizable ethylenically unsaturated monomer other than vinyl acetate or isobutene, in an aqueous dispersion in the presence of an effective amount of from 0.1 to 2.0 percent by weight based on monomer charge of a free radical forming copolymerization catalyst and a surface active agent and/or protective colloid until said dispersion contains solid polymer in the range of 65 to 95 percent by weight of the total weight of total vinyl acetate charge, together with unpolymerized vinyl acetate and isobutene, then allowing the dispersion to vent freely to the atmosphere to remove unpolymerized isobutene and continuing polymerization of residual vinyl acetate.

References Cited
UNITED STATES PATENTS

| | | | |
|---|---|---|---|
| 2,396,677 | 3/1946 | Brubaker | 260—87.3 |
| 2,421,971 | 6/1947 | Sperati | 260—87.3 |
| 2,947,735 | 8/1960 | Bartl | 260—87.3 |
| 2,983,696 | 5/1961 | Tocker | 260—87.3 |
| 3,231,534 | 1/1966 | Blades et al. | 260—29.6 TA |
| 3,240,706 | 3/1966 | Thomson et al. | 260—87.3 |
| 3,423,353 | 1/1969 | Levine et al. | 260—29.6 R |
| 3,440,200 | 4/1969 | Lindemann et al. | 260—29.6 TA |

HAROLD D. ANDERSON, Primary Examiner

U.S. Cl. X.R.

260—17 A, 29.6 T, 29.6 TA, 29.6 WA, 29.7 T